United States Patent [19]

Schneider et al.

[11] 4,300,034
[45] Nov. 10, 1981

[54] GAS TUNGSTEN ARC WELDING TORCH

[75] Inventors: Urban A. Schneider, St. Petersburg; Robert E. Monley, Tampa; Raymond H. Glatthorn, St. Petersburg; Robert L. Nelson, Tampa, all of Fla.

[73] Assignee: Westinghouse Electric Corp., Pittsburgh, Pa.

[21] Appl. No.: 77,210

[22] Filed: Sep. 20, 1979

[51] Int. Cl.³ .............................................. B23K 9/16
[52] U.S. Cl. ................................ 219/75; 219/137.42; 219/146.21
[58] Field of Search ................ 219/74, 75, 146.21, 219/137.42

[56] References Cited

U.S. PATENT DOCUMENTS

| 2,794,898 | 6/1957 | Gibson | 219/75 |
| 3,123,702 | 3/1964 | Keidel et al. | 219/74 |
| 3,180,967 | 4/1965 | Hill | 219/75 |
| 3,521,023 | 7/1970 | Dahlman et al. | 219/75 |
| 3,826,888 | 7/1974 | Garfield et al. | 219/137.42 X |
| 3,924,095 | 12/1975 | Lucas, Jr. | 219/74 X |

FOREIGN PATENT DOCUMENTS 2437776  2/1976  Fed. Rep. of Germany ........................ 219/146.21

137202  8/1979  German Democratic Rep. ... 219/75

Primary Examiner—E. A. Goldberg
Assistant Examiner—Keith E. George
Attorney, Agent, or Firm—Daniel C. Abeles

[57] ABSTRACT

A gas tungsten arc welding torch having an elongated gas nozzle (18) with an oblong cross section designed for deep groove, narrow gap welding. The nozzle is rotatably coupled to and communicates with a gas port within the main torch body (16) and defines a gas passage along the length of the welding electrode (10), which extends through the longitudinal axis of the nozzle. The nozzle (18) includes a detachable end section (42) which captures and supports a replaceable gas lens (30) disposed within the gas passage of the nozzle within ⅛ to 1 inch from the nozzle orifice (40), and traverse to the direction of gas flow. The electrode (10) is formed from a solid tungsten rod center (12) and a concentric outer sleeve (14) substantially lower in electrical resistivity than the tungsten rod, which is adhesively and cohesively bonded to the tungsten. The outer sleeve extends from the point of electrical connection (32) within the main torch body (16) to a point on the tungsten electrode downstream of the gas lens. The nozzle is sealably mounted (38) to the main torch body and readily detachable for easy replacement.

4 Claims, 4 Drawing Figures

GAS TUNGSTEN ARC WELDING TORCH

CROSS REFERENCE TO RELATED APPLICATIONS

This application is related to the subject matter of copending applications Ser. No. 077,209, filed Sept. 20, 1979 and Ser. No. 077,208, filed Sept. 20, 1979, both of which are assigned to the Westinghouse Electric Corporation.

BACKGROUND OF THE INVENTION

This invention pertains generally to gas tungsten arc welding torches and more particularly to such torches designed for deep groove, narrow gap welding.

Gas tungsten arc welding processes achieve coalescence by heating the weld zone with an arc struck between a tungsten electrode and the workpiece. To prevent oxidation, the heated weld zone, the molten metal and the non-consumable electrode which carries the welding current, are shielded from the atmosphere by an inert gas stream which is directed from the electrode holder, commonly referred to as the welding torch.

Most commercial torch designs employ a collet within the main torch body for supporting and transferring weld current to the tungsten electrode. The electrode generally extends from the collet, axially through a surrounding gas nozzle and projects a short distance beyond the nozzle orifice. The shield gas is conveyed through the nozzle, along the electrode and out of the orifice to the weld.

Shield gas coverage is an important factor in establishing a successful weld with the gas tungsten arc welding process. Adequate shield gas coverage is critically important when welding high strength, low alloy steels such as A533, which is used in the manufacture of steam generators. This material is extremely difficult to weld utilizing the gas tungsten arc welding process due to the high stresses set up in the material from the quench and temper techniques employed in its manufacture. The highly stressed material readily oxidizes on contact with air. A superheated welding puddle applied with the tungsten inert gas arc welding process on such carbon and low alloy steels shows a higher propensity for oxidation than would be encountered in welding higher alloy steels. High porosity, excess surface oxidation, embrittlement and cracking can result from a lack of adequate shielding in such applications. Because of these characteristics of carbon and low alloy steels and the difficulty in obtaining adequate shield gas coverage, the welding industry has experienced only limited success in applying the gas tungsten arc welding process. A more conventional slag producing welding process is usually employed through the industry for joining materials of this type in semi-automated manufacturing applications. While the conventional slag bearing welding process is satisfactory for a number of semiautomated manufacturing operations, it has not produced as high a quality of weld as the tungsten inert gas arc welding process. In addition, the slag bearing process requires that the welding operation be performed in a flat, downhand (1G) position which is not always practical. For example, in a number of manufacturing arrangements and field service applications it is desirable to apply the weld in a horizontal (2G) position.

The ability to achieve adequate shield gas coverage while utilizing the gas tungsten arc welding process is further complicated when the process is applied in a deep, narrow groove. A deep, narrow groove weld prep is desirable because it reduces the amount of the weld deposit required and the time it takes to complete the weld. Such grooves may extend in excess of 3 inches in depth, have a root radius in the order of 7/32 inch radius or smaller and as little as a 1°, to a 6° to 8°, included angle. The geometry and restrictiveness of the groove thus makes it difficult to maintain complete gas coverage of the weld puddle until coalescence is achieved. In addition, the use of a light shield gas, composed of for example 75% helium and 25% argon, which is desirably employed in such applications, adds to the difficulty in establishing good shield coverage. Furthermore, while welding in the 2G position, the hot metal adjacent the weld groove heats the surrounding air which rises and creates a draft in the weld groove (chimney effect) which draws away the gas coverage.

Accordingly, one object of this invention is to provide a new welding torch design that will provide adequate shield gas coverage in a deep, narrow groove, applying the gas tungsten arc welding process in the 2G position to high strength, low alloy steels, such as A533. In addition, it is an object of this invention to provide such a welding torch having interchangeable nozzles and replaceable parts that can be readily adapted to satisfy the requirements of various sized weld grooves. Furthermore, it is an object of this invention to provide such a torch that can be easily orientated and requires a minimum of maintenance.

SUMMARY OF THE INVENTION

Briefly, in accordance with this invention an improved gas tungsten arc welding torch is provided having a main torch body and a non-consumable welding electrode electrically coupled through and supported by the main torch body with one end of the electrode extending outwardly therefrom. An elongated gas nozzle is coupled at one end to the main torch body and surrounds a substantial portion of the extended length of the welding electrode, communicably coupling with a gas port within the main torch body and defining a gas passage along the extended length of the electrode. A replaceable gas lens is disposed within the gas passage of the nozzle substantially adjacent the extended end of the nozzle and traverse to the direction of gas flow, for establishing a laminar flow of gas parallel to the electrode and downstream of the lens; the lens being supported by the nozzle and detachable for easy replacement.

Desirably, the gas nozzle is constructed in two detachable sections with the replaceable lens supported at the interface between sections. In the preferred arrangement, the electrode comprises a solid tungsten rod center and a concentric outer sleeve substantially lower in electrical resistivity then the tungsten rod, which is adhesively and cohesively bonded to the tungsten. The outer sleeve is arranged to extend from the point of electrical connection within the main torch body to a point on the tungsten electrode downstream of the gas lens. In one preferred arrangement the gas lens is located from ½ to 1½ inches from the gas nozzle orifice. Desirably, the nozzle is constructed with an oblong cross section and is sealably and detachably mounted to the main torch body in a manner to be rotatable about the axis of the electrode.

BRIEF DESCRIPTION OF THE DRAWINGS

For better understanding of the invention, reference may be had to the preferred embodiment, exemplary of the invention, shown in the accompanying drawings, in which.

DESCRIPTION OF THE PREFERRED EMBODIMENT

Figure 1:
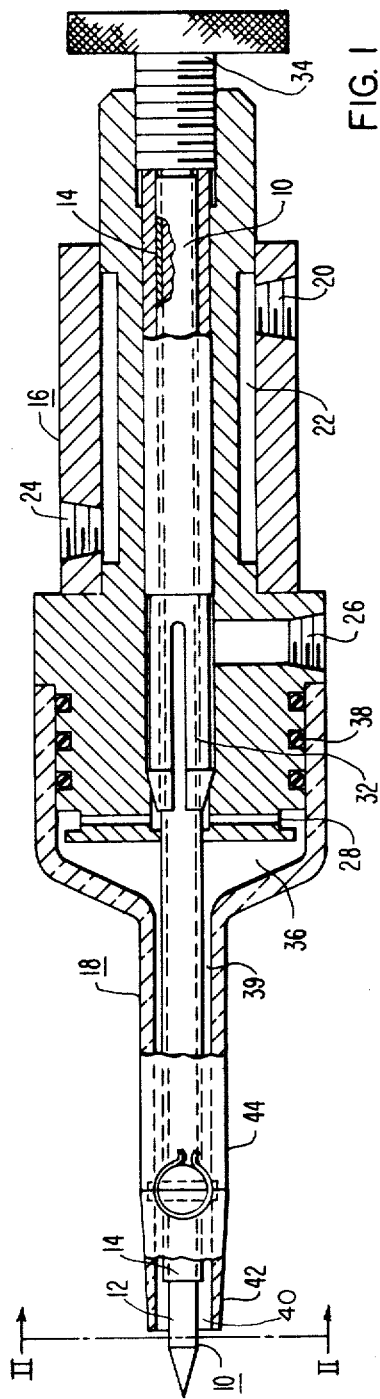
FIG. 1 is a cross sectional view of a welding torch embodying the concepts of this invention.

In accordance with this invention, as shown in FIG. 1, an improved gas tungsten arc welding torch is provided designed for deep, narrow groove applications. The main components of the torch include the torch body 16, the gas nozzle 18 and the composite electrode 10. In the preferred embodiment the torch body 16 is constructed from copper and serves as a large heat sink with direct water coolant applied through inlet 24, circulated around the housing through an annular conduit 22 and exhausted at the water outlet port 20. The shield gas is introduced through gas inlet 26 and is directed along the centrally disposed electrode 10 and through the gas ports 28 to the inside periphery of the nozzle chamber 36. The portion of the main torch body in contact with the gas nozzle 18 has a circular cross section and the gas ports 28 are radially disposed around the circumference of the inner walls of the chamber 36.

Figure 2:
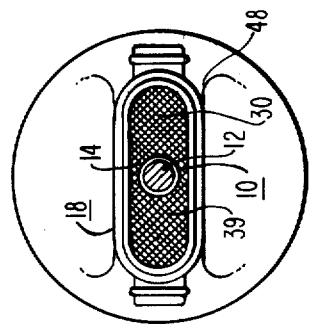
FIG. 2 is a cross sectional view taken along lines II—II of FIG. 1.

The nozzle is formed from an electrical insulating material (i.e. ceramic) to isolate the electrode from contact with the side walls of the weld groove. The nozzle also functions to channel the shield gas from the main torch body to the weld puddle in a manner to establish laminar flow and assure satisfactory shield coverage of the weld. The enlarged end of the nozzle 18 is sealably coupled to the torch body 16 by the O rings 38 and, desirably, is mounted to be rotatable about the longitudinal axis of the electrode 10. The nozzle is tapered downstream of the chamber 36 to permit full insertion into a deep narrow groove. The tapered interior width 39 of the nozzle is gauged to supply proper clearance for the electrode 10 and establish an annular gas channel to funnel the shield gas to the orifice 40. A diffusion lens arrangement 30 having multiple layers of progressively finer gauged screening is disposed in the tapered portion of the gas channel, proximate to and upstream of the orifice 40. The tapered portion of the nozzle has an oblong cross section as shown in FIG. 2, to maximize the shield gas coverage within the narrow, deep groove geometry of the weld prep.

Figure 3:
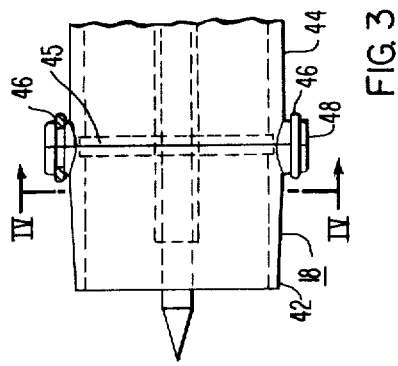
FIG. 3 is a top view of a portion of the gas nozzle shown in FIG. 2.
Figure 4:
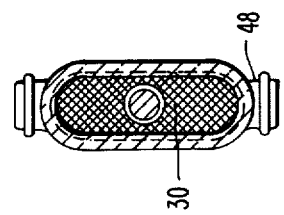
FIG. 4 is a cross section of the gas nozzle of FIG. 3 taken along the lines IV—IV thereof.

As can be noted by reference FIGS. 1 and 3 the tapered portion of the nozzle is constructed in two separate parts, a lower nozzle section 42 and an upper nozzle section 44 joined at a mating flange 48 by ring clamps 46. The mating flange is machined with an interior ledge 45 which captures and supports the removable, replaceable diffuser lens 30.

The welding electrode is channeled through a central annulus within the main torch body and is captured and partially supported by the collet 32, which transfers the welding current to the electrode. A knurled nut 34 at the upper end of the torch body serves to capture the electrode within the central annulus. The electrode 10 is a composite structure formed by flame spraying an electrically conductive material of low resistivity 14 onto a tungsten center 12 and is more fully described in application Ser. No. 077,209, filed Sept. 20, 1979. The copper coating minimizes the amount of resistance heating generated by the welding current as it traverses the electrode to the arc.

Experimental results have shown that an improvement in laminar flow can be achieved with the diffusion lens 30 located from $\frac{1}{2}$ to $1\frac{1}{2}$ inches from the nozzle orifice 40; with optimum results established with the diffusion lens located $\frac{7}{8}$ inch to 1 inch from the orifice. The copper cladding extends over the length of the electrode through and to a point downstream of the diffusion lens to reduce localized heating of the lens material and terminates at or before the orifice. The tungsten electrode, bared of copper cladding desirably extends up to $1\frac{1}{4}$ inch beyond the tip of the orifice.

Thus, in accordance with this invention the following benefits are realized. Electrical contact is made with the conducting copper cladding of the electrode at the main torch body, where a large copper heatsink and direct water cooling is provided. The controlled operating environment in this portion of the torch thus enables the collet to maintain good electrical contact with the electrode, which increases the efficiency of the weld current transfer and reduces localized resistance heating which might otherwise accelerate wear of the various torch components. The gas radially exiting from the ports 28, impinging upon the side walls of the chamber 36, experiences a large pressure drop and good mixing which serves to reduce preferential flow of the gas through the tapered volume 39, which might otherwise be encountered from wall resistance along the gas passage. The gas diffuser lenses 30 consisting of fine mesh screens of multiple sizes combined in a tandem packet provide additional back pressure and/or gas pressure drop; diffuse the inert shield gas; cause laminar gas flow characteristics through the remainder of the nozzle; and project a columnated lamainar gas stream beyond the orifice 40 onto the welding arc and molten weld puddle. The copper clad tungsten electrode reduces the vulnerability of the mesh diffuser screens to the high rate of heat radiation eminating from the uncoated extended end of the tungsten electrode. The copper cladding extends through a small closely fitting opening within the diffuser screens, sized to prohibit gas leakage. Experimental results have shown that the cladding maintains the tungsten at a low enough temperature to avoid oxidation and deterioration of the screens, which is normally inherent in such designs. The detachable nozzle sections not only allow servicing of the diffuser screens without removal of the nozzle, but also permit replacement of the orifice section alone. It is not uncommon to experience damage to the nozzle orifice while oscillating in a narrow groove. In addition, the O-ring compressed seal arrangement between the nozzle and the mating torch body enables easy replacement of the entire nozzle to accommodate different nozzle sizes, as called for in application Ser. No. 077,208, filed Sept. 20, 1979. Furthermore, the coupling arrangement of the nozzle to the main torch body enables rotation of the nozzle about the electrode to accommodate orientation of the oblong tapered portion of the nozzle within a narrow groove without altering the disposition of the main torch body.

Accordingly, the torch arrangement of this invention provides a durable and readily serviceable arrangement of components that enhances shield gas coverage in a deep, narrow groove weld prep.

We claim as our invention:

1. A gas tungsten arc welding torch comprising:

a main torch body;

a nonconsumable welding electrode electrically coupled through and supported by the main torch body with one end extending therefrom, the electrode including a solid tungsten rod center and a concentric outer sleeve substantially lower in electrical resistivity than the tungsten rod, adhesively and cohesively bonded to the tungsten;

an elongated gas nozzle coupled at one end to the main torch body and surrounding a substantial portion of the extended length of the welding electrode, communicably coupling with a gas port within the main torch body and defining a gas passage along the extended length of the electrode; and a replaceable gas lens disposed within the gas passage of the nozzle substantially adjacent the extended end of the nozzle and traverse to the direction of gas flow, for establishing a laminar flow of gas parallel to the electrode downstream of the lens, the lens being supported by the nozzle and detachable therefrom for easy replacement and the outer sleeve of the electrode extending from the point of electrical connection within the main torch body to a point on the tungsten electrode downstream of the gas lens.

2. The gas tungsten arc welding torch of claim 1 wherein the gas lens is located from $\frac{1}{8}$ inch to 1 inch from the edge of the extended end of the nozzle.

3. The gas tungsten arc welding torch of claim 1 wherein the gas nozzle is constructed in two detachable sections with the replaceable lens supported at the interface between sections.

4. The gas tungsten arc welding torch of claim 3 wherein a portion of the gas nozzle has an oblong cross section which extends along a substantial length of said nozzle, the detachable sections interfacing within such oblong portion proximate the end of the extended length of said nozzle.

* * * * *